March 5, 1935.  R. H. YOUNG  1,993,353
SAUSAGE COOKER
Original Filed April 24, 1933   2 Sheets-Sheet 1
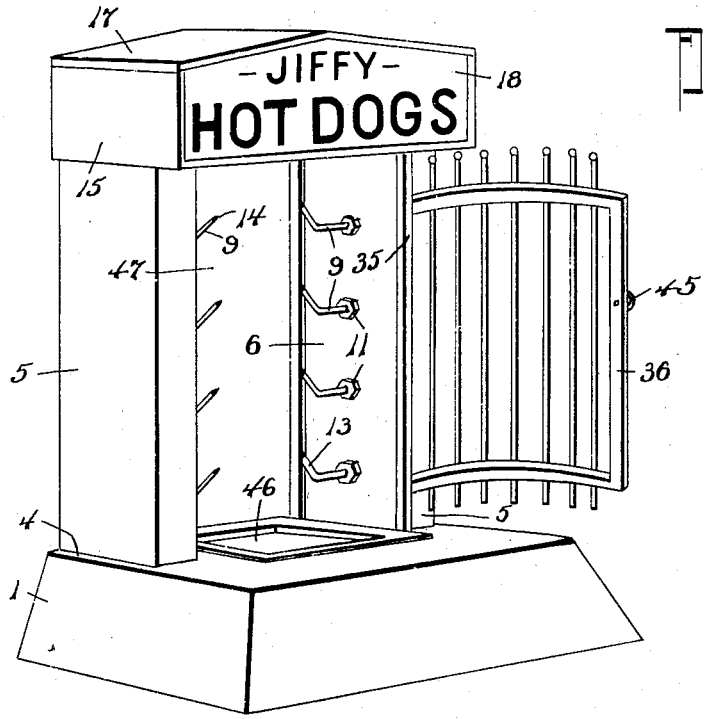
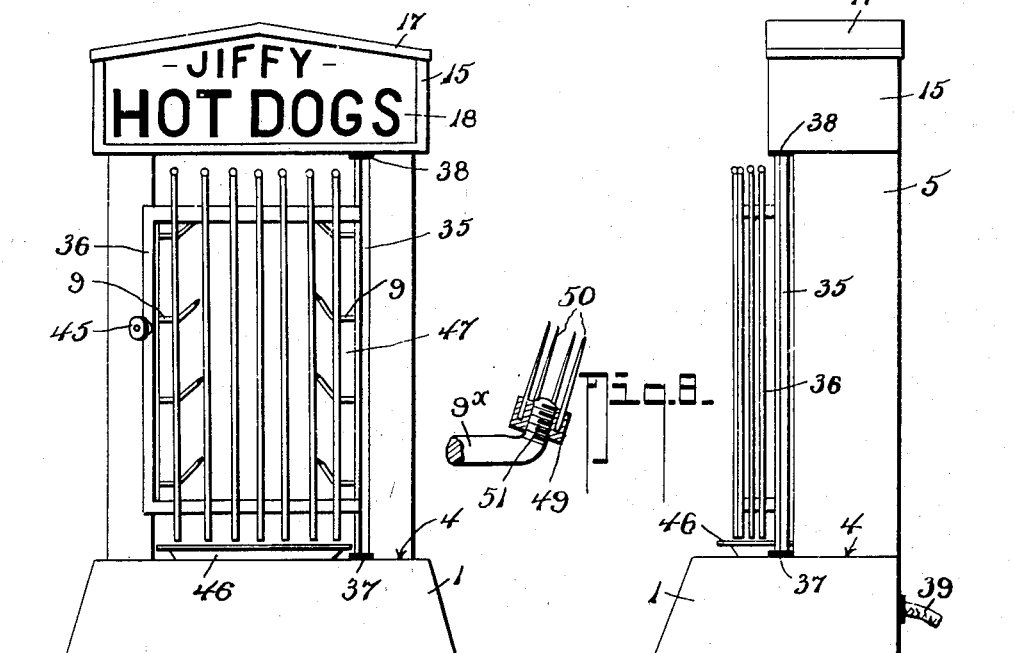
Inventor
Robert H. Young.
By Albert E. Dieterich
Attorney March 5, 1935. R. H. YOUNG 1,993,353
SAUSAGE COOKER
Original Filed April 24, 1933 2 Sheets-Sheet 2
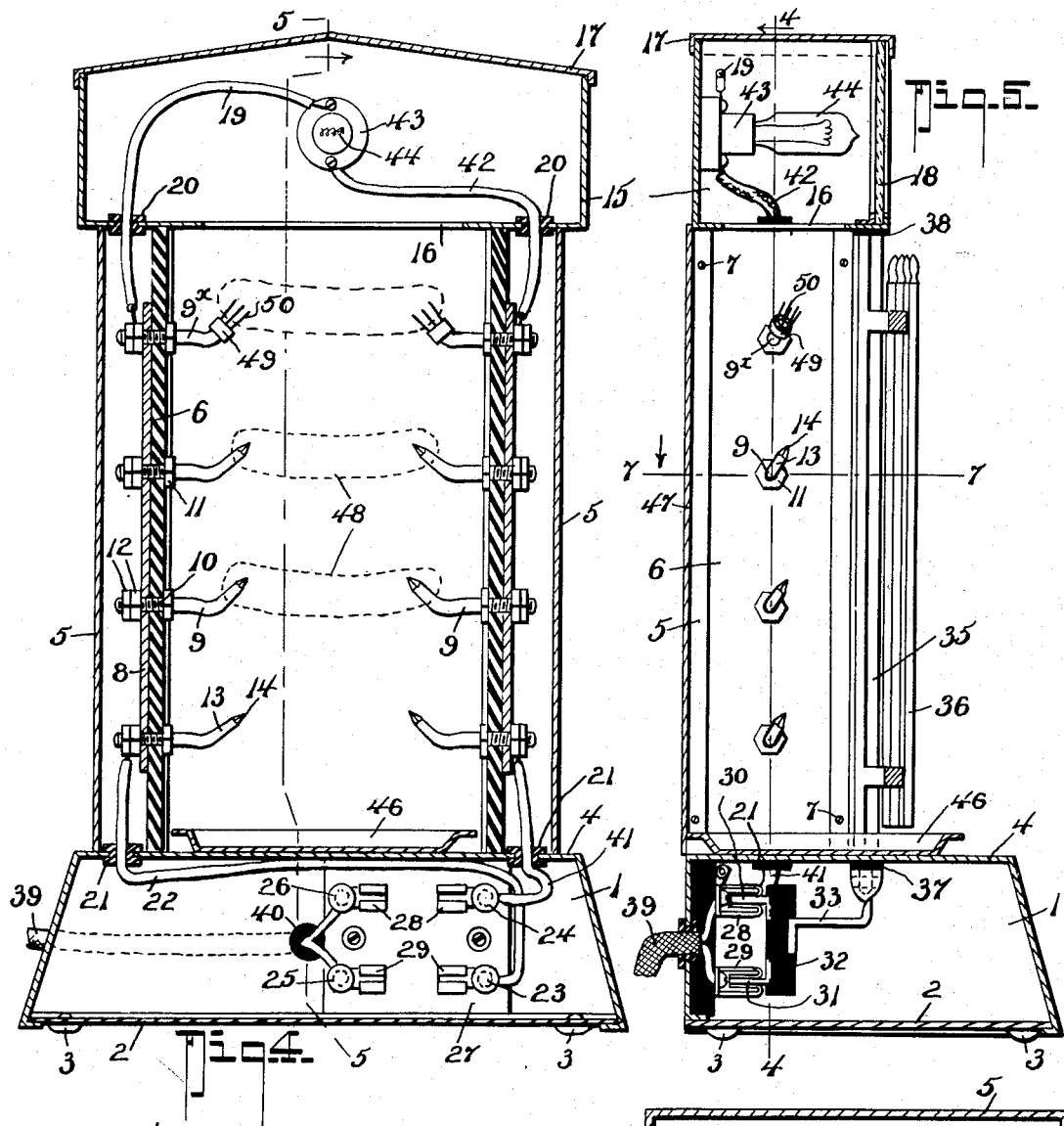
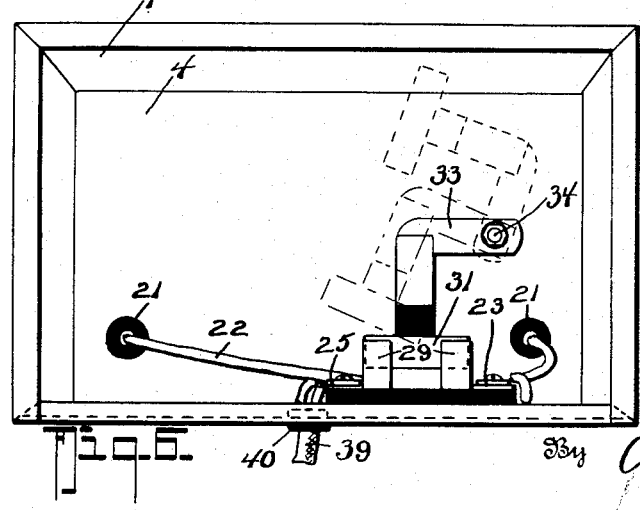
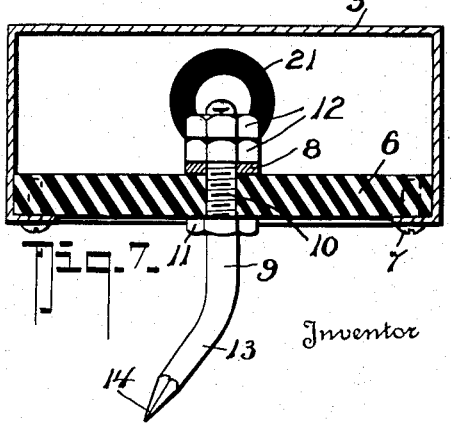
Inventor
Robert H. Young
By Albert E. Dieterich
Attorney Patented Mar. 5, 1935

1,993,353

UNITED STATES PATENT OFFICE 1,993,353

SAUSAGE COOKER

Robert H. Young, Portland, Oreg.

Application April 24, 1933, Serial No. 667,713
Renewed July 24, 1934

9 Claims. (Cl. 219—19)

My invention relates to electrical cooking furnaces or stoves and particularly to those which cook the food by passing an electric current through the same.

More particularly, the invention has for its object to provide a neat, simple, safe and inexpensive cooker especially designed for cooking "wienerwurst" or "hot dogs", as they are commonly known.

Further, it is an object of the invention to provide a cooker whose electrical construction is such as fully to comply with the rules of the fire and electrical underwriters.

Further, it is an object to provide a cooker with a protective gate or grille through which the cooking is visible, the gate being utilized as a means for closing and opening the electric circuit, so that before the gate can be opened far enough for one to insert one's hand, the current will be turned off, this making it impossible for one to obtain a shock in placing or removing the "dogs".

Other objects of my invention will in part be obvious and in part be pointed out hereinafter.

To the attainment of the aforesaid objects and ends, the invention still further resides in the novel details of construction, combination and arrangement of parts, all of which will be first fully described in the following detailed description and then be particularly pointed out in the appended claims, reference being had to the accompanying drawings, in which:—

Figure 1 is a perspective view of the preferred embodiment of my invention, the gate being open.

Figure 2 is a front elevation of the cooker with the gate closed.

Figure 3 is a side elevation of the same.

Figure 4 is a vertical section of the cooker, the parts being positioned as with the gate open and taken on substantially the line 4—4 of Figure 5.

Figure 5 is a vertical section on the line 5—5 of Figure 4, the gate being closed.

Figure 6 is an inverted plan view with the bottom plate removed, the gate being closed, the position of the switch knives when the gate is open being shown in dotted lines.

Figure 7 is an enlarged detail horizontal section on the line 7—7 of Figure 5.

Figure 8 is a detail view hereinafter referred to.

In the drawings in which like numerals of reference designate like parts in all the figures, 1 represents a hollow base which has a removable bottom 2 carrying rubber feet 3.

Mounted securely on the top 4 of the base and spaced apart are two hollow columns or standards 5. These columns 5 are preferably of U-shape in cross section, having the open sides opposite one another. The open sides are closed by means of slabs of suitable insulation 6 secured to the columns 5 by screws 7.

Each slab 6 carries within its column 5 a buss bar or conductor strip 8. Each slab also carries a plurality of pins 9 which are rigidly secured to the slabs 6 and buss bars 8 by threaded shanks 10 and nuts 11 and 12. The pins 9 each have an upwardly and outwardly inclined portion 13 terminating in a pointed end 14.

Mounted on the columns or standards 5 is a hollow top 15 having an opening 16 in its bottom from column to column, and it also has a removable top 17 by which access into the top 15 may be had when desired. The top 15 also has a transparent front 18 on which suitable explanatory matter, such as "Jiffy Hot Dogs", appears.

A wire 19 carries current from one buss bar 8 to the base socket 43 of a lamp 44 mounted within the top 15, while a wire 42 connects said socket 43 with the other buss bar 8.

Where the wires 19 and 42 pass through the bottom of the top 15, suitable bushings 20 are provided. Similar bushings 21 are provided in the top 4 of the base 1 for the wires 22 and 41 which connect the respective buss bars 8 with the switch terminals 23 and 24 respectively. The current lead-in wires 39 from the source of supply pass through a bushing 40 and connect to the switch terminals 25 and 26.

I preferably use a double knife type switch, the base 27 of which is securely fastened within the base 1, preferably to the back wall thereof. This switch has two sets of spring knife-receiving clips 28 and 29 for the circuit closing knives 30—31 which are rigidly carried by the insulating block 32 that is mounted on the arm 33 that is rigidly secured at 34 to the hinge-bar 35 of the gate 36. The hinge-bar turns in suitable lower and upper bearing bushings 37 and 38 in the base 1 and the top 15 respectively. The gate has a knob 45 by which it can be opened and closed.

A drip pan 46 collects any grease or other drippings from the sausages 48.

Connected to the columns 5—5 is a back plate 47 that preferably completely fills the space between top 15 and bottom 4 and columns 5—5, and the front surface of the plate 47 is preferably provided with white heat-resisting enamel.

The switch knives 30—31 and their carrier

32—33 are so designed that as the gate is moved from open to closed position, the knives will first engage the spring clips 28—29 to which the lead-in wires 39 are attached (see dot and dash lines of Figure 6). When this occurs the gate will be closed far enough so that one may not be able to insert one's hand through the opening. Then upon completing the closing movement the knives enter the clips 28—29 to which wires 22 and 41 are attached and thereby close the circuit. When the circuit is closed the current flows through lamp 44 and through any sausages 48 which may be impaled on the opposite pairs of pins 9—9 and cooks the sausages through which it flows by electrolysis.

Upon opening the gate the reverse action at the switch occurs.

If, in closing the gate, it is not closed tightly the front pair of clips 28—29 serve as stops for the knives 30—31 and prevent the closing of the circuit until the gate has been tightly closed. This prevents even a careless operator from getting shocked.

Furthermore, the lighting of the lamp indicates that the current is on and the pins 9 are alive.

Instead of providing the pins 9 with single points 14, they may be threaded as at 51 and a collar 49 screwed on (see Figures 4 and 8), the collar being provided with a plurality of pins 50 as shown.

All pins 9 may be provided with the collars 49 having the multiple points 50, or some (as shown in Figure 4) may be provided with the single points 14, or all may be provided with the single points (see Figures 1 and 2) as may be desired.

From the foregoing description, taken in connection with the accompanying drawings, it is thought the complete construction, combination and arrangement of parts constituting my invention will be apparent to those skilled in the art and, while for purposes of illustration I have shown a preferred embodiment of the invention, it will be obvious that changes in the details of construction and design of parts may readily be made without departing from the spirit of the invention and the scope of the appended claims.

What I claim is:

1. A cooker comprising a base, a pair of spaced-apart standards carried by the base, a set of pins carried by each standard, and an electric circuit, one wire of which is connected to one set of pins and the other wire of which is connected to the other set of pins, the pins of each set being spaced from one another and the pins of one set being opposed to those of the other set whereby the space between a pin of one set and the corresponding pin of the other set may be bridged by the food to be cooked.

2. A cooker comprising a base, a pair of spaced-apart standards carried by the base, a set of pins carried by each standard, an electric circuit, one wire of which is connected to one set of pins and the other wire of which is connected to the other set of pins, a guard for the pins and a circuit switch in the electric circuit and operated by said guard, the pins of each set being spaced from one another and the pins of one set being opposed to those of the other set whereby the space between a pin of one set and the corresponding pin of the other set may be bridged by the food to be cooked.

3. A cooker comprising a structure having a base, parallel columns spaced apart, a back plate between the columns, a top over the columns, a set of pins carried by each column and projecting into the space between the same, and an electric circuit whose terminals connect to the respective sets of pins.

4. A cooker comprising a structure having a base, parallel columns spaced apart, a back plate between the columns, a top over the columns, a set of pins carried by each column and projecting into the space between the same, an electric circuit whose terminals connect to the respective sets of pins, a gate over the front of the space between the columns and a switch in said electric circuit and controlled by said gate to open the circuit when the gate is opened and vice versa.

5. A cooker comprising a structure having a base, parallel columns spaced apart, a back plate between the columns, a top over the columns, a set of pins carried by each column and projecting into the space between the same, and an electric circuit whose terminals connect to the respective sets of pins, said top having a transparent front and an electric light in the top and connected in said electric circuit to be illuminated when the circuit is energized.

6. A cooker comprising a structure having a base, parallel columns spaced apart, a back plate between the columns, a top over the columns, a set of pins carried by each column and projecting into the space between the same, an electric circuit whose terminals connect to the respective sets of pins, a gate over the front of the space between the columns and a switch in said electric circuit and controlled by said gate to open the circuit when the gate is opened and vice versa, said top having a transparent front and an electric light in the top and connected in said electric circuit to be illuminated when the circuit is energized.

7. A cooker comprising a hollow base, a pair of hollow columns arising from the base and spaced apart, a back plate over the space between said columns, a front gate over the space between said columns, a hollow top supported by said columns and having an opening registering with the space between said columns, a lamp in said top, said columns having insulation slabs, a set of pins carried by each slab and projecting into the space between said columns, buss bars connecting the pins of each slab as a unit, a conductor wire from each buss bar to said lamp, lead-in wires, a switch mounted in the base and having terminals to which said lead-in wires are connected and having other terminals connected with the respective buss bars, said switch including a movable contact member secured to said gate for bridging said switch terminals for closing and opening the circuit accordingly as the gate is open or closed.

8. A cooker comprising a hollow base, a pair of hollow columns arising from the base and spaced apart, a back plate over the space between said columns, a front gate over the space between said columns, a hollow top supported by said columns and having an opening registering with the space between said columns, a lamp in said top, said columns having insulation slabs, a set of pins carried by each slab and projecting into the space between said columns, buss bars connecting the pins of each slab as a unit, a conductor wire from each buss bar to said lamp, lead-in wires, a switch mounted in the base and having terminals to which said lead-in wires are connected and having other terminals connected with the respective buss bars, said switch including a movable contact member secured to said gate for bridging said switch terminals for closing and opening the circuit accordingly as the gate is open or closed, and said top having a transparent front with suitable indicia illuminated by said lamp when the circuit is closed, said lamp also casting its rays down through the opening in the top into the space between the columns.

9. A cooker comprising a base, a pair of spaced-apart standards carried by the base, a set of pins carried by each standard, and an electric circuit, one wire of which is connected to one set of pins and the other wire of which is connected to the other set of pins, said pins having collars secured to their ends and a plurality of pin points carried by their collars the pins of each set being spaced from one another and the pins of one set being opposed to those of the other set whereby the space between a pin of one set and the corresponding pin of the other set may be bridged by the food to be cooked.

ROBERT H. YOUNG.